United States Patent
Jones

(10) Patent No.: US 6,755,891 B2
(45) Date of Patent: Jun. 29, 2004

(54) PROCESS FOR THE TREATMENT OR REMOVAL OF IMPURITIES IN A HYDROMETALLURGICAL EXTRACTION PROCESS

(75) Inventor: David L. Jones, Delta (CA)

(73) Assignee: Cominco Engineering Services Ltd., Vancouver (CA)

( * ) Notice: Subject to any disclaimer, the term of this patent is extended or adjusted under 35 U.S.C. 154(b) by 0 days.

(21) Appl. No.: 10/122,346

(22) Filed: Apr. 16, 2002

(65) Prior Publication Data

US 2003/0192404 A1 Oct. 16, 2003

(51) Int. Cl.[7] .............................................. C22B 3/06
(52) U.S. Cl. .............................. 75/743; 423/27; 423/47
(58) Field of Search ........................... 75/743; 423/27, 423/47

(56) References Cited

U.S. PATENT DOCUMENTS 5,730,776 A * 3/1998 Collins et al. ................. 75/728
6,455,019 B2 * 9/2002 Jones ............................ 423/24

OTHER PUBLICATIONS

Harris, G.B. et al, Noranda Research Centre, *The Stability of Arsenic–Bearing Residues*, Arsenic Metallurgy Fundamentals and Applications, Jan. 25–28, 1988, pp. 469 to 488.
Krause et al, *Solubilities and Stabilities of Ferric Arsenate Compounds*, Hydrometallurgy, 22 (1989), pp. 311 to 337.
Riveros, P.A. et al, *Arsenic Disposal Practices In The Metallurgical Industry*, Canadian Metallurgical Quarterly, vol. 40, No. 4, pp. 395–420, 2001.
Lawrence, R.W. et al, *Removing and Stabilizing As In Acid Mine Water*, JOM, pp. 27 to 29, Sep. 1999.

* cited by examiner

Primary Examiner—Melvyn Andrews
(74) Attorney, Agent, or Firm—Elbie R. de Kock

(57) ABSTRACT

A Process for the treatment or removal of impurities, such as arsenic, antimony or bismuth, generated as by-products during smelting and refining of copper concentrates, comprises subjecting the by-products to pressure oxidation along with a copper concentrate in a hydrometallurgical copper extraction process or the treatment of impurities when present in a concentrate by subjecting the concentrate to a hydrometallurgical extraction process.

21 Claims, 2 Drawing Sheets

PROCESS FOR THE TREATMENT OR REMOVAL OF IMPURITIES IN A HYDROMETALLURGICAL EXTRACTION PROCESS

FIELD OF THE INVENTION

This invention relates to a process for the treatment or removal of impurities such as arsenic, antimony and bismuth, such as, for example, generated as by-products during smelting and refining of copper concentrates or when present in an ore or concentrate being treated by a hydrometallurgical metal extraction process. It also relates to the treatment of other impurities, such as fluoride and mercury.

BACKGROUND OF THE INVENTION

Arsenic, antimony and bismuth are often found in naturally occurring copper (sulphide) ores, and therefore each or several of them are often a minor constituent of copper concentrates which are obtained from sulphide ore by means of the well-established floatation processes.

These elements have little or no commercial value in copper concentrates, unlike other base metals which may also occur in copper concentrates, such as zinc, nickel or cobalt, but instead constitute deleterious impurities which must be removed during the subsequent refining process on the concentrate, otherwise the product of such refining process, i.e. copper metal, will be impure and lose value.

If copper concentrates containing such deleterious impurities are processed by the conventional smelting and refining processes, the impurities are commonly separated out at different stages of the process into a variety of by-products.

The by-products may be solids, such as fine dusts collected from the smelter, or liquids, such as purge streams, derived from the gas cleaning section of an acid plant attached to the smelter.

These by-products, due to their hazardous or toxic nature, are often difficult and expensive to dispose of. In addition, these materials are regulated and usually cannot be disposed of in a general tailings area where the tailings from the concentration process are frequently sent. As a result, concentrates containing the impurities are often too expensive to process and the metal values cannot be recovered economically.

Another impurity which sometimes occurs in copper sulphide ores is fluorine. It can generally be separated out at the concentration stage fairly efficiently, by rejecting the fluoride-containing minerals to the tailings stream, but in some circumstances concentrates do contain significant amounts of fluorine. This causes difficulty for the smelting and refining process, and therefore there is a maximum allowed level of fluorine in concentrates, above which it is a penalty element, and above a certain higher level may even preclude the sale of the concentrate.

SUMMARY OF THE INVENTION

According to the invention there is provided a method of treating a by-product from a copper smelting or refining process, which by-product contains an element selected from the group consisting of As, Sb, Bi and Hg, comprising the steps of: subjecting a copper ore or concentrate also containing iron and a source of bisulphate or sulphate ions to pressure oxidation at an elevated temperature and pressure in the presence of oxygen and an acidic solution containing halide ions; and subjecting said by-product to the pressure oxidation together with said ore or concentrate to obtain a resulting pressure oxidation slurry containing copper and a compound of said element.

Also according to the invention there is provided a method of treating a copper ore or concentrate also containing fluoride comprising the steps of subjecting the ore or concentrate along with a source of bisulphate or sulphate ions to pressure oxidation at an elevated temperature and pressure in the presence of oxygen and an acidic solution containing halide ions, the halide ions being selected from the group consisting of chloride ions and bromide ions, to obtain a resulting pressure oxidation slurry; subjecting the slurry to a liquid/solid separation step to obtain a resulting pressure oxidation filtrate and a solid residue; and continuously recycling the pressure oxidation filtrate to the pressure oxidation thereby to solubilize the fluoride up to a saturation concentration in the pressure oxidation filtrate, to establish an equilibrium condition whereby no further nett dissolution of fluoride takes place and substantially all fluoride in the ore or concentrate goes into the solid residue.

Further according to the invention there is provided a method of dispensing with an impurity contained in a copper ore or concentrate, which impurity is in the form of an element selected from the group consisting of As, Sb, Bi and Hg, comprising the steps of subjecting a copper ore or concentrate also containing iron and a source of bisulphate or sulphate ions to pressure; oxidation at an elevated temperature and pressure in the presence of oxygen and an acidic solution containing halide ions; and subjecting said by-product to the pressure oxidation together with said ore or concentrate to obtain a resulting pressure oxidation slurry containing copper and a compound of said element.

Further objects and advantages of the invention will become apparent from the description of preferred embodiments of the invention below.

BRIEF DESCRIPTION OF THE DRAWINGS

The invention will now be described by way of example with reference to the accompanying drawings, in which.

DETAILED DESCRIPTION OF PREFERRED EMBODIMENTS

In the following description, reference is made only to arsenic for simplicity but this term should be understood to include the similar elements antimony and bismuth.

Copper sulphide ores, including those that also contain arsenic, are usually concentrated in a first step, using the well-established methods of mineral dressing, i.e. crushing, grinding, flotation, etc., to produce a copper concentrate, with typically 25–40% copper.

Figure 1:
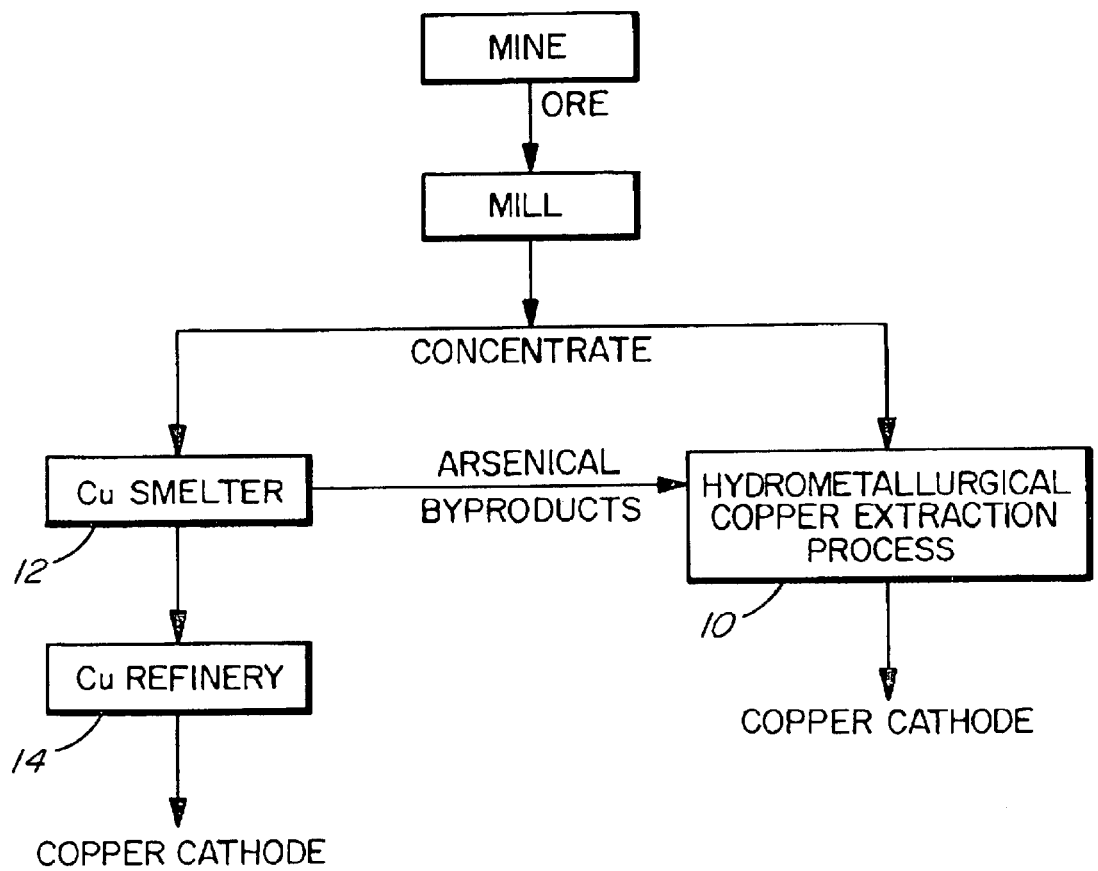
FIG. 1 is a flow diagram illustrating processes for the treatment of arsenic impurities which are contained in an ore or concentrate or obtained as by-products from a copper smelter and refinery.

Such copper concentrate may be processed by one of two methods, as shown in FIG. 1.

In the first method, as shown on the right hand side of FIG. 1, a hydrometallurgical process 10 which incorporates pressure oxidation, is used to extract the copper from the ore. In this method, any arsenic contained in the concentrate reports almost exclusively to the leach residue in the process.

In the leach residue, the arsenic is in a stable form, probably ferric arsenate, essentially insoluble in the environment of a tailings pond designed to hold the tailings from a concentrator or mill. In the tailings pond, the acidity is low, as evidenced by the pH typically between pH 4–12.

In the second method, as shown on the left hand side of FIG. 1, a conventional copper smelter 12 using a pyrometallurgical method, followed by a conventional copper electrorefinery 14 is used. It is understood that the term smelter actually includes a number of associated plants, including feed preparation, gas cleaning, and acid plant.

In this case, any arsenic contained in the concentrate will report in part to some by-product streams from the smelter 12. The amount and composition of such by-product streams will depend on the nature of the smelting process, but typically there are both solid streams, for example dust, and liquid streams, for example purge acid from the gas cleaning section of the acid plant attached to the smelter 12.

Such by-product streams must be directed somewhere, and given the arsenic content, usually they must be considered hazardous waste, and therefore subject to environmental regulations.

Figure 2:
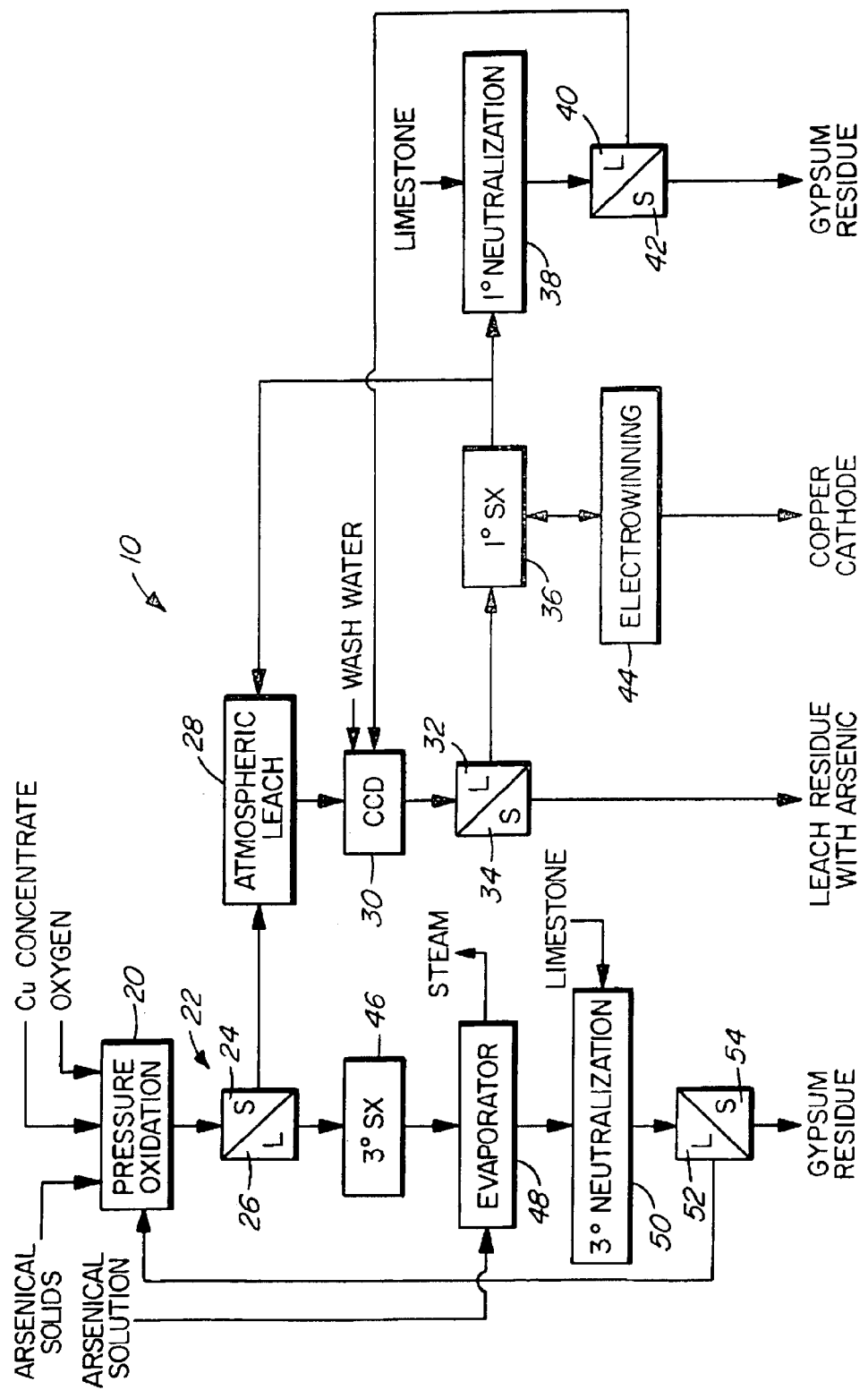
FIG. 2 is a flow diagram showing a hydrometallurical process which is used in the processes of FIG. 1.

According to one aspect of the invention, these by-product streams from the smelter 12 are incorporated into the pressure oxidation stage of a hydrometallurgical process, such as the process 10 shown on the right hand side of FIG. 1, and more fully described with reference to FIG. 2 below. According to this method the by-product streams are introduced into the pressure oxidation stage along with copper concentrate, so that the arsenic content is safely stabilized as ferric arsenate or other stable arsenic compound.

Before hydrometallurgical processing of the concentrate, the concentrate is sometimes subjected to a first step of regrinding the concentrate, so as to reduce the particle size to a p80 of about 30 micron, (meaning that 80% of the particles should be less than 30 micron), or expressed by another common criterium, about 5–10% of the particles should be larger than 325 Mesh, or 44 micron.

The regrinding, is clearly dependent on the particle size of the concentrate, as received from the mill, which in some cases is quite coarse and in some cases quite fine, depending on the grain size of the minerals in the ore. Grinding is relatively expensive, given the large tonnages involved, so mills do not grind any finer than necessary to achieve the desired recovery and grade in the final concentrate.

Following regrinding, the concentrate is subjected to pressure oxidation 20 in an autoclave (FIG. 2), with the addition of high pressure oxygen, and a recycled acidic solution containing chloride, sulphate, and copper.

The pressure oxidation is typically carried out in continuous mode, operating at about 125° C.–160° C., most typically 150° C., and about 1000–2000 kPa total pressure, most typically about 1500 kPa. Given the steam pressure at these temperatures, it is understood that the oxygen partial pressure is about three quarters of the total pressure. Preferably, high purity oxygen is used, so as to minimize the build up of inert gases in the vapour space of the autoclave used for the pressure oxidation 20. Typically, at least 95% pure oxygen is used, and more typically 96–98% purity is preferred, although it is possible to operate with lower purity oxygen.

Approximately one-hour retention time in continuous mode is required, although this may be varied down to 10 minutes and up to 2 hours, approximately, in certain cases. The solids density of the pressure oxidation 20 is typically 200 grams per liter of slurry although this may vary down to about 120 grams per liter or even lower, and up to 400 grams per liter or even higher on occasion. Choice of the solids density is governed by considerations of heat balance, so as to achieve autogenous operation (no heat supplied or taken away by internal cooling), and considerations of acid requirements, as the process typically consumes about 0.1–0.3 tonnes of acid per tonne of concentrate in the pressure oxidation stage 20.

Arsenical solids are also introduced into the autoclave for the pressure oxidation 20, along with the concentrate, in a slurry form.

Typically the valence of As is III, and during the pressure oxidation this is converted to As V, by the oxidizing environment within the pressure oxidation 20.

The copper concentrate typically will contain about 20–35% Fe, being a constituent of such minerals as pyrite, $FeS_2$, and chalcopyrite, $CuFeS_2$, and other common sulphide minerals found in typical copper concentrates.

It is necessary that there is sufficient Fe in the copper concentrate to have a ratio of Fe:As of at least 1:1, and preferably higher, say 3:1, when considering all feed materials, solids and liquids, to the pressure oxidation. This Fe:As ratio is necessary to ensure that the formation of a stable arsenic compound, such as ferric arsenate ($FeAsO_4$) will take place, otherwise there is a danger of forming copper arsenate, $CU_3(AsO_4)_2$, or some other similar compound, which is undesirable, as this results in a loss of copper, and also the possibility of an unstable residue, i.e. the possible higher solubility of arsenic in a general tailings pond.

The acid balance of the pressure 20 oxidation is controlled so as to produce a final pH (during continuous operation) of at least pH 2, and preferably, above pH 2.5. This ensures that the arsenic stays in the solids, and does not go into solution. The acid balance can be controlled by controlling (a) the amount of acid fed into the pressure oxidation 20, (either by the amount of acidic solution or by the concentration of acid in this solution), and (b) the amount of acid created during pressure oxidation 20 due to oxidation of sulphide minerals to sulphuric acid. This sulphur oxidation may be controlled by factors such as temperature, oxygen partial pressure, retention time, particle size of the concentrate, acid concentration of the feed acid, and other variables under the control of the process designer and operators. Given the diverse nature of copper concentrates, no one formula can be given which fits all concentrates, but instead each concentrate must be considered separately, and conditions chosen to optimize the process.

The slurry from the pressure oxidation 20 is separated into a solid 24 and a liquid 26 by means of a liquid/solid separation step 22.

The solid 24 containing arsenic and some copper is treated by an atmospheric leach step 28, with an acidic solution typically carried out in continous mode, at ambient temperature, one hour retention time, about 5–20% solids, and with a final pH of about pH 1.5–2.0. Under these conditions, leaching of copper is optimized, and that of iron (Fe) is minimized, typically about 1% of the Fe is leached. The arsenic in the residue is not leached at all, or in extreme cases, where the As content is high, about 1% As is leached.

The slurry from the atmospheric leach 28 is separated into a liquid 32 and a solid 34 by means of counter current decantation (CCD) 30.

The liquid 32 is subjected to copper solvent extraction 36, whereby copper is removed, and the resultant acid is recycled back to the atmospheric leach 28, or subjected to neutralization 38 with limestone to produce a liquid 40 which is recycled to the CCD 30 and a solid residue 42 (gypsum) which is discarded.

The pregnant copper solution obtained from the solvent extraction 36 is subjected to electrowinning 44 to produce copper electrodes.

The solid 34 form the CCD 30, which is washed with washwater, is the leach residue containing the arsenic in stabilized form.

The liquid 26 from the pressure oxidation 20 is subjected to copper solvent extraction 46 to obtain a copper solution which can be treated for copper recovery and a raffinate which is introduced into an evaporator 48 in order to reduce the water content.

The arsenical solutions that may be derived from the smelter 12 are typically acidic in nature, and are fed into the evaporator 48, where they are mixed with the raffinate from the solvent extraction 46, also acidic. The resultant solution from the evaporator 48 is then neutralized 50 with limestone, to remove excess acid and to obtain a liquid 52 which is recycled to the pressure oxidation 20 and a solid residue 54 (gypsum) which is discarded.

The arsenic in the arsenic by-product solution is thus fed into the pressure oxidation 20, whereby it is oxidized to As V and combined with Fe in the copper concentrate, to form ferric arsenate, or other stable form of arsenic. Due to the closed loop nature of the process 10, all arsenic bearing solutions are recycled and no arsenic bearing solutions are released to the environment.

During processing of concentrates containing fluoride, some fluoride dissolves both in the pressure oxidation stage 20 and the atmospheric leach stage 28, but by means of operation on a continuous basis for some time the fluoride concentration in both circuits, primary and tertiary, is stabilized and no further increase in fluoride concentration is observed.

A feature of the invention is that there are no significant liquid effluents from the process 10, i.e. releases of liquid streams to the environment, so that all liquids are eventually recycled internally. Thus the fluoride-containing leach liquor, also containing copper and other elements, is eventually recycled to the front of the process 10. After a number of such recycles, the fluoride concentration builds up, but the proportion of fluoride from the concentrate that does leach decreases, and approaches zero at steady state operation. Thus, all of the fluoride in the concentrate goes into the solid residue at steady state.

Occasionally mercury, Hg, is found in copper concentrates as a deleterious impurity, similar to As. In such cases, all Hg is found exclusively in the residues in stable form.

Although certain preferred embodiments of the present invention have been shown and described in detail, it should be understood that various changes and modifications may be made therein without departing from the scope of the appended claims.

I claim:

1. A method of treating a by-product from a copper smelting or refining process, which by-product contains an element selected from the group consisting of As, Sb, Bi and Hg, comprising the steps of:
   subjecting a copper ore or concentrate also containing iron and a source of bisulphate or sulphate ions to pressure oxidation at an elevated temperature and pressure in the presence of oxygen and an acidic solution containing halide ions; and
   subjecting said by-product to the pressure oxidation together with said ore or concentrate to obtain a resulting pressure oxidation slurry containing copper and a compound of said element.

2. The method according to claim 1, wherein the compound of said element is a ferric compound.

3. The method according to claim 1, wherein the by-product is in solid form and is injected along with said copper concentrate into an autoclave in which said pressure oxidation is effected.

4. The method according to claim 1, wherein said pressure oxidation slurry is subjected to a liquid/solid separation step to obtain a pressure oxidation filtrate and a solid containing the compound of said element.

5. The method according to claim 4, wherein said pressure oxidation filtrate is recycled to the pressure oxidation and wherein said by-product is in liquid form, the by-product being combined with the pressure oxidation filtrate being recycled to the pressure oxidation.

6. The method according to claim 5, wherein the pressure oxidation filtrate contains copper in solution and further comprising the step of recovering copper from the filtrate prior to the recycle thereof.

7. The method according to claim 5, further comprising the step of subjecting the pressure oxidation filtrate and the by-product to evaporation prior to the recycle thereof.

8. The method according to claim 5, further comprising the step of subjecting the pressure oxidation filtrate and the by-product to neutralization prior to the recycle thereof.

9. The method according to claim 4, wherein the solid from the pressure oxidation contains copper and further comprising the step of subjecting the solid to an acidic leaching to obtain a copper solution and a solid residue containing the compound of the element.

10. The method according to claim 9, further comprising the step of recovering copper from the copper solution.

11. The method according to claim 1, wherein the iron and said element is present in a ratio of at least 1:1.

12. The method according to claim 11, wherein said ratio is about 3:1.

13. The method according to claim 1, wherein the pressure oxidation is carried out at a pH value of at least 2.

14. The method according to claim 13, wherein the pressure oxidation is carried out at a pH value of above 2.5.

15. The method according to claim 1, wherein the pressure oxidation is carried out at a temperature of from about 125° C. to about 160° C.

16. The method according to claim 15, wherein pressure oxidation is carried out at a temperature of about 150° C.

17. A method of treating a copper ore or concentrate also containing fluoride comprising the steps of:
   subjecting the ore or concentrate along with a source of bisulphate or sulphate ions to pressure oxidation at an elevated temperature and pressure in the presence of oxygen and an acidic solution containing halide ions, the halide ions being selected from the group consisting of chloride ions and bromide ions, to obtain a resulting pressure oxidation slurry;
   subjecting the slurry to a liquid/solid separation step to obtain a resulting pressure oxidation filtrate and a solid residue; and
   continuously recycling the pressure oxidation filtrate to the pressure oxidation, thereby to solubilize the fluoride up to a saturation concentration in the pressure oxidation filtrate, to establish an equilibrium condition whereby no further nett dissolution of fluoride takes place and substantially all fluoride in the ore or concentrate goes into the solid residue.

18. The method according to claim 17, further comprising the steps of:
   subjecting the solid residue to an acidic leaching to obtain a leach solution and a solid leach residue; and continuously recycling the leach solution to the acidic leaching thereby to solubilize the fluoride up to a saturation concentration in the leach solution to establish an equilibrium condition whereby no further nett dissolution of fluoride into the leach solution takes place.

19. The method according to claim 17, further comprising the step of recovering copper from the pressure oxidation filtrate prior to the recycle thereof.

20. The method according to claim 18, further comprising the step of recovering copper from the leach solution prior to the recycle thereof.

21. A method of dispensing with an impurity contained in a first copper ore or concentrate, which impurity is in the form of an element selected from the group consisting of As, Sb, Bi and Hg, comprising the steps of:

subjecting a second copper ore or concentrate also containing iron and a source of bisulphate or sulphate ions to pressure oxidation at an elevated temperature and pressure in the presence of oxygen and an acidic solution containing halide ions; and subjecting said first copper ore or concentrate by-product to the pressure oxidation together with said second ore or concentrate to obtain a resulting pressure oxidation slurry containing copper and a compound of said element.

* * * * *